United States Patent [19]

Nauroth et al.

[11] 4,360,388

[45] Nov. 23, 1982

[54] CERIUM CONTAINING PRECIPITATED SILICA, PROCESS FOR ITS PRODUCTION

[75] Inventors: Peter Nauroth, Wesseling; Robert Kuhlmann, Erftstadt; Günther Türk, Hanau; Rudolf Bode, Bad Orb; Arthur Reisert, Kahl, all of Fed. Rep. of Germany

[73] Assignee: Degussa Aktiengesellschaft, Frankfurt, Fed. Rep. of Germany

[21] Appl. No.: 233,434

[22] Filed: Feb. 11, 1981

[30] Foreign Application Priority Data

Feb. 12, 1980 [DE] Fed. Rep. of Germany ....... 3005137

[51] Int. Cl.$^3$ .................. C09C 1/28; C08L 83/04
[52] U.S. Cl. ............... 106/288 B; 524/403; 524/588
[58] Field of Search ............ 252/451, 453, 462; 106/288 B, 309; 260/37 SB

[56] References Cited

U.S. PATENT DOCUMENTS

| | | | |
|---|---|---|---|
| 2,462,236 | 2/1949 | Thomas | 252/451 |
| 3,313,739 | 4/1967 | Acker | 252/451 |
| 3,716,493 | 2/1973 | Acker et al. | 106/288 B |
| 3,832,327 | 8/1974 | Hackbarth et al. | 106/288 B |
| 4,122,160 | 10/1978 | Wason | 106/288 B |
| 4,224,295 | 9/1980 | Brandt et al. | 106/288 B |
| 4,289,681 | 9/1981 | Nauroth et al. | 106/288 B |

*Primary Examiner*—Carl F. Dees
*Attorney, Agent, or Firm*—Cushman, Darby & Cushman

[57] ABSTRACT

Cerium containing precipitated silica is disclosed as well as a process for its production as well as compositions hardenable to elastomers which contain the cerium containing precipitated silica. The precipitated silica

| | | |
|---|---|---|
| BET-surface area according to DIN 66 131 | m$^2$/g | 140 ± 40 |
| Loss on drying according to DIN 55 921 | Wt.-% | 2.0–4.0 |
| Loss on ignition according to DIN 55 921 | Wt.-% | 2.5–12.5 |
| pH-according to DIN 53 200 | | 3.0–7.0 |
| Conductivity in 4% aqueous dispersion at 20° C. | μs | 500 |
| Packed density according to DIN 53 194 | g/l | 80 ± 40 |
| CeO$_2$-content, based on the material dried for 2 hours at 105° C. | Wt.-% | 0.3–50 |
| Sieve residue according to Mocker 45 μm (DIN 53 580) | Wt.-% | 0.2 |

They are prepared by adding a cerium (IV) salt solution to the original precipitated suspension of a precipitated silica. The compositions produced with the cerium containing precipitated silica hardenable elastomers based on diorganopolysiloxanes exhibit excellent heat stability. Additionally, the cerium containing precipitated silica acts as a fire retardant agent.

12 Claims, No Drawings

CERIUM CONTAINING PRECIPITATED SILICA, PROCESS FOR ITS PRODUCTION

BACKGROUND OF THE INVENTION

It is known to employ precipitated silica in combination with 0.3-3.0 weight % of a carboxylic acid or a derivative thereof for the heat stabilization of siloxane oils (Japanese Pat. No. 34868/76). These precipitated silicas, however, are not effective in diorganopolysiloxane elastomers such as heat hardening silicone rubber.

In German AS No. 1242866 there is described a composition of monazite sand corresponding to a rare earth oxide mixture for the heat stabilization of molding compositions based on diorganopolysiloxane elastomers. These molding compositions can also include reinforcing fillers such as silica dioxide sublimed form. The disadvantage of these mixed oxides are the intensive coloration of the elastomer, the high amount of additive of 16-40 parts by weight to 100 parts by weight of elastomer, the lack of fine particle size (about 50 microns) and the difficult dispersibility of the rare earth oxides, the surface spots brought about in films produced from the elastomer compositions.

In German AS No. 1230562 there is described the use of hydrophobized precipitated silica as antiaging agent.

German OS No. 2617434 described the employment of a mixture of pryogenically produced titanium dioxide and cerium (III) oxide as a heat stabilizer for diorganopolysiloxane elastomers.

In German OS No. 2727611 there is described a flame protected silicone rubber containing 0.1-3 parts by weight of cerium (IV) hydroxide

SUMMARY OF THE INVENTION

The object of the invention is the preparation of a cerium containing precipitated silica which has the following physico-chemical data.

| BET-surface area according to DIN 66 131 | $m^2/g$ | 140 ± 40 |
|---|---|---|
| Loss on drying according to DIN 55 921 | Wt. % | 2.0-4.0 |
| Loss on ignition according to DIN 55 921 | Wt. % | 2.5-12.5 |
| pH-according to DIN 53 200 | | 3.0-7.0 |
| Conductivity in 4% aqueous dispersion at 20° C. | $\mu S$ | 500 |
| Packed density according to DIN 53 194 | g/l | 80 ± 40 |
| $CeO_2$-content, based on the material dried for 2 hours at 105° C. | Wt. % | 0.3-50 |
| Sieve residue according to Mocker 45 $\mu m$ (DIN 53 580) | Wt. % | 0.2 |

DIN indicates German Industrial Standard

In a preferred embodiment the cerium containing precipitated silica can have the following physico-chemical properties.

| BET-surface area according to DIN 66 131 | $m^2/g$ | 140 ± 40 |
|---|---|---|
| Loss on drying according to DIN 55 921 | Wt.-% | 2.0-4.0 |
| Loss on ignition according to DIN 55 921 | Wt.-% | 4.0-7.0 |
| pH-according to DIN 53 200 | | 3.5-7.0 |
| Conductivity in 4% aqueous dispersion at 20° C. | $\mu S$ | 500 |
| Packed density according to DIN 53 194 | g/l | 75 ± 25 |
| $CeO_2$-content based on the material dried for 2 hours at 105° C. | Wt.-% | 10-20 |
| Sieve residue according to Mocker 45 $\mu m$ (DIN 53 580) | Wt.-% | 0.2 |

A further object of the invention is the development of a process for the production of the cerium containing precipitated silica having the following physico-chemical properties.

| BET-surface area according to DIN 66 131 | $m^2/g$ | 140 ± 40 |
|---|---|---|
| Loss on drying according to DIN 55 921 | Wt.-% | 2.0-4.0 |
| Loss on ignition according to DIN 55 921 | Wt.-% | 2.5-12.5 |
| pH-according to DIN 53 200 | | 3.0-7.0 |
| Conductivity in 4% aqueous dispersion at 20° C. | $\mu s$ | 500 |
| Packed density according to DIN 53 194 | g/l | 80 ± 40 |
| $CeO_2$-content, based on the material dried for 2 hours at 105° C. | Wt.-% | 0.3-50 |
| Sieve residue according to Mocker 45 $\mu m$ (DIN 53 580) | Wt.-% | 0.2 | which comprises simultaneously adding to an aqueous receiver consisting of water having a pH-value of 7 to 9 at a temperature above 50° C. up to the boiling point of the reaction mixture while using shearing forces and maintaining the pH-value constant at 7 to 9 water glass solution and acid during a time span of 80 to 120 minutes, whereby after the conclusion of the precipitation a pH-value of 7 to 9 is present in the reaction mixture, adding to the thus obtained precipitated silica-original suspension an aqueous cerium (IV) salt solution, adjusting the now acid mixture to a pH-value of 6 to 8; filtering off the solid reaction product, working the thus obtained cerium containing precipitated silica filter cake with water, drying and grinding.

In a preferred embodiment of the invention the aqueous receiver has a pH-value of 7 to 8.5. The establishment of the pH-value of the aqueous receiver, which in the neutral condition, i.e. with a pH-value of 7, can consist of water alone, can take place by addition of e.g. water glass solution, NaOH or $Na_2CO_3$.

Thus especially the pH-value regulation of the aqueous receiver can be carried out with a water glass solution which has a molar ratio $SiO_2:Na_2O = 1:3.46$ and a content of 26.8 weight % $SiO_2$ and 8.0 weight % $Na_2O$.

As acids there can be employed, e.g. sulfuric acid, nitric acid, phosphoric acid, carbon dioxide (carbonic acid), formic acid, or acetic acid.

In a preferred embodiment of the process there can be used sulfuric acid in a concentration of 50 to 96 weight %.

In a preferred embodiment the cerium containing precipitated silica filter cake can be fluidized by using shearing forces, spray dried and ground. For grinding the spray dried precipitated silica there can be preferably used a bar crusher.

For fluidizing the cerium containing precipitated silica filter cake there can be used dispersers, homogenizers or similar apparatus which exert intensive shearing forces, a preferred embodiment of this apparatus is described in German Pat. No. 2447613 the entire disclosure of which is hereby incorporated by reference and relied upon. It can be necessary at a cerium dioxide content of above 20 weight % to add additional water to the precipitated silica filter cake.

As the cerium (IV) salt solution, there can preferably be added continuously under stirring a $Ce(SO_4)_2.4H_2O$ solution saturated solution saturated at 20° C. which contains 100 g/l of $Ce(SO_4)_2.4H_2O$ through which it can be made certain that a homogeneous distribution of the cerium (IV) compound in the precipitated silica suspension takes place. This type of ceric sulfate solution at 20° C. has a pH of 0.65.

The therefore strongly acid cerium containing precipitated silica suspension can be brought to a pH-value of 6 to 8 by addition of a 15–20 weight % aqueous sodium hydroxide solution. The addition of the sodium hydroxide solution takes place thereby continuously with stirring.

A further object of the invention is the preparation of compositions hardenable to elastomers based on diorganopolysiloxanes which contain the cerium containing precipitated silica of the invention.

The cerium containing precipitated silica can be 0.05 to 50% of the composition hardenable to an elastomer. In a preferred embodiment of the invention the compositions hardenable to elastomers can contain 0.1 to 1.0 weight % of the cerium containing precipitated silica.

Surprisingly the cerium containing precipitated silica of the invention can be very well dispersed in the compositions hardenable to elastomers.

The compositions hardenable to elastomers of the invention surprisingly show a high thermal stability. Because of the small amount of cerium containing precipitated silica the compositions hardenable to elastomers of the invention show nearly no yellow color and no spots on the surface.

The compositions of the invention hardenable to elastomers surprisingly show self extinguishing properties. Therefore, they can advantageously be employed as cable insulating material.

Unless otherwise indicated all parts and percentages are by weight.

The composition can comprise, consist essentially of, or consist of the stated materials and the process can comprise, consist essentially of, or consist of the steps set forth with such materials.

DETAILED DESCRIPTION OF THE INVENTION

EXAMPLE 1

There were present in a rubber coated precipitation vessel 100 liters of water, which were adjusted to a pH of 8.5 with water glass and heated to a temperature of 83° C. In the course of the 80 minutes, there were subsequently added to this receiver 19.0 liters of a water glass solution (commercial product having a mole ratio $SiO_2:Na_2O=1:3.40$ and a content of 26.8 weight % $SiO_2$ and 8.0 weight % $Na_2O$) and 1.78 liters of concentrated sulfuric acid (96 weight %). The sulfuric acid was supplied via an EKATO disc stirrer. The EKATO turbine acted thereby not only as a stirrer but also as a shearing agent on the precipitated silica.

During the precipitation time mentioned the pH and temperature were held constant. After the end of the precipitation the reaction mixture showed a pH of 8.5. The solids content of the suspension at the end of the precipitation was 58 g/l. Immediately after the end of the precipitation there were added 27.4 liters of a $Ce(SO_4)_2.4H_2O$ solution having a concentration of 100 g/l (20° C.) in the course of 15 minutes with a running EKATO turbine. Thereby there was established a pH of 1.7. In connection with the addition of the cerium (IV) salt solution there were added to the suspension in the running turbine 4.5 liters of a 20% sodium hydroxide solution, whereby a pH-value of 7 was established. The cerium containing precipitated silica with the help of a laboratory filter press was separated from the precipitation suspension and washed with water until low in electrolyte. The filter press paste was subsequently fluidized using shearing forces but without further additions of water or acid and dried by means of a commercial spray drier. After grinding by means of a laboratory pinned disk mill, there was obtained 8.2 kg of a cerium containing precipitated silica having a light yellow color which had the following physical-chemical properties:

| | | |
|---|---|---|
| BET-surface area according to DIN 66 131 | $m^2/g$ | 136 |
| Loss on drying according to DIN 55 921 | Wt. % | 2.3 |
| Loss on ingition according to DIN 55 921 | Wt. % | 5.3 |
| pH-according to DIN 53 200 | | 4.2 |
| Conductivity in 4% aqueous dispersion at 20° C. | μS | 190 |
| Packed density according to DIN 53 194 | g/l | 68 |
| $CeO_2$ content based on the material dried for 2 hours at 105° C. | Wt. % | 13.6 |
| Sieve residue according to Mocker 45 μm (DIN 53 580) | Wt. % | 0.1 |

EXAMPLE 2

The production of a precipitated silica-original suspension was carried out as in Example 1. In connection with the precipitation there were added to the suspension 30.2 liters of a $Ce(SO_4)_2.4H_2O$ solution containing 100 g/l at 20° C. in the course of 22 minutes in a running EKATO turbine and 66 liters of a 15% aqueous sodium hydroxide solution. The further working up of the cerium containing precipitated silica such as filtration, washing, paste fluidization, spray drying, and grinding, was carried out as in Example 1.

There were obtained 8.4 kg of a cerium containing precipitated silica having a light yellow color which exhibited the following physico-chemical properties:

| | | |
|---|---|---|
| BET-surface area according to DIN 66 131 | $m^2/g$ | 130 |
| Loss on drying according to DIN 55 921 | Wt. % | 2.8 |
| Loss on ignition according to DIN 55 921 | Wt. % | 5.7 |
| pH-according to DIN 53 200 | | 4.0 |
| Conductivity in 4% aqueous dispersion at 20° C. | μS | 180 |
| Packed density according to DIN 53 194 | g/l | 61 |
| $CeO_2$-content based on the material dried for 2 hours at 105° C. | Wt. % | 15.0 |
| Sieve residue according to Mocker 45 μm | | |

EXAMPLE 3

The production of an original-precipitated silica suspension was carried out as in Example 1. It was treated with 1.25 liters of a cerium (IV) sulfate solution having a concentration of 100 g/l at 20° C. and subsequently adjusted to a pH-value of 7 with 15% aqueous sodium hydroxide. The further working up of the precipitated silica was carried out as in Example 1. There were obtained 6.9 kg of a cerium containing precipitated silica having the following properties:

| | | |
|---|---|---|
| BET-surface area according to DIN 66 131 | m$^2$/g | 140 |
| Loss on drying according to DIN 55 921 | Wt. % | 2.4 |
| Loss on ignition according to DIN 55 921 | Wt. % | 3.1 |
| pH-according to DIN 53 200 | | 6.6 |
| Conductivity in 4% aqueous dispersion at 20° C. | μS | 390 |
| Packed density according to DIN 53 194 | g/l | 49 |
| CeO$_2$-content based on the material dried for 2 hours at 105° C. | Wt. % | 0.74 |
| Sieve residue according to 45 μm (DIN 53 580) | Wt. % | 0.1 |

EXAMPLE 4

There was produced a precipitated silica-original suspension according to Example 1. Thereon there were added to the precipitated silica suspension 210 liters of Ce(SO$_4$)$_2$.4H$_2$O solution having a concentration of 100 g/l. Subsequently the suspension was adjusted to a pH-value of 7 with 15% aqueous sodium hydroxide. The further working up of the cerium containing precipitated silica was carried out as in Example 1. Thereby, however, for fluidization of the filter cake paste there were added per kg of the filter cake paste 0.8 kg of water. There were obtained 12.6 kg of a cerium containing silica having the following properties.

| | | |
|---|---|---|
| BET-surface area according to DIN 66 131 | m$^2$/g | 105 |
| Loss on drying according to DIN 55 921 | Wt. % | 2.2 |
| Loss on ignition according to DIN 55 921 | Wt. % | 11.8 |
| pH-according to DIN 53 200 | | 3.2 |
| Conductivity in 4% aqueous dispersion at 20° C. | μS | 330 |
| Packed density according to DIN 53 194 | g/l | 94 |
| CeO$_2$-content based on the material dried for 2 hours at 105° C. | Wt. % | 49.3 |
| Sieve residue according to Mocker 45 μm (DIN 53 580 | Wt. % | 0.1 |

For testing the effectiveness of the cerium containing silica of the invention as a heat stabilizer in compositions based on diorganopolysiloxanes hardenable to elastomers, the cerium containing precipitated silicas of Examples 1 and 2 were subjected to a heat aging test in a test recipe in comparison to pyrogenic titanium dioxide P 25$^R$ (Degussa), pure cerium oxide and a cerium dioxide (50%) predispersed in silicone polymers as well as in comparison to the non-stabilized silicone rubber mixture.

As heat vulcanizing organosiloxanes there can be used for example those which contain organic substituents consisting of methyl, ethyl-, phenyl-, trifluormethylphenyl, [F$_3$CC$_6$H$_4$-)] or triethylsilylmethylene groups [(CH$_3$)$_3$SiCH$_2$-] e.g. dimethyl-, diethyl-, phenylmethyl-, phenylethyl-, ethylmethyl-, trimethylsilylmethylenemethyl-, trimethylsilylmethyleneethyl-, trifluoromethylphenylmethyl- or trifluoromethylphenylethylsiloxane or mixed polymerizates of such compounds. Besides the polymerizates can contain limited amounts of diphenylsiloxanes-, bis-trimethylsilylmethylenesiloxanes-, bis-trifluoromethylphenylsiloxane units as well as also siloxanes with units of the formula RSiO$_{1.5}$ and R$_3$SiO$_{0.5}$ where R represents one of the above-mentioned groups, e.g. methyl, ethyl, phenyl, trifluoromethylphenyl or triethylsilylmethylene.

The following recipe was used:
100 parts Siloprene VS (Bayer)
40 parts Aerosil 200 V$^R$ (Degussa)
1.4 parts Siloprenvernetzer,
Cl 50 (Bayer)
1-3 parts heat stabilizer The heat hardening silicone rubber mixtures were vulcanized in known manner for 7 minutes at 130° C. in the vulcanization mold and for 6 hours at 200° C. in a circulating air cabinet and the mechanical properties determined.

The silicone rubber was stored in a circulating air cabinet at 300° C. for the stabilization test. Its mechanical properties such as Shore-A hardness, tensile strength, elongation at break, and rebound elasticity were investigated at fixed intervals.

The results of these investigations are collected in Table I and are commented as follows:

The heat stabilization of the vulcanized compositions hardenable to elastomers through the use of the silicas of the invention clearly exceeded that of the pure cerium dioxide. The predispersed CeO$_2$ to be sure behaves more advantageously than the directly inserted CeO$_2$ but is much inferior to the silica of the invention.

In comparison to the pyrogenic titanium dioxide on an equal weight basis, based on the cerium containing precipitated silica there is an equal effectiveness.

However, if there is compared the heat stabilization effect based on the active materials (CeO$_2$ content with TiO$_2$ concent) then it is found that the cerium containing silica of the invention with 13-15 weight % CeO$_2$ is superior by about 6-7 times.

The silicas of the invention according to Examples 1 and 2 also clearly are superior to the materials of the state of the art in regard to the optical properties of the vulcanizable filled with these materials. While titanium dioxide produces a white opacity and cerium dioxide or cerium dioxide batches a gray-white coloring the hardenable compositions vulcanized to elastomers according to the invention only produce a light yellow coloring.

The testing of the self-extinguishing properties of the silicone rubber was carried out on a basic mixture of the following composition:
100 parts Silopren VS$^R$
40 parts Aerosil 200 V$^R$
1.4 parts Siloprevernntzer Cl 50$^R$
0.14 part hexachloroplatinic acid Silopren VS[R] is a vinyl methyl polysiloxane elastomer.

Aerosil 200 V[R] is a pyrogenically produced silica of Degussa

Siloprenoernetzer Cl 50[R] is a bis-2,4-dichlorobenzoyl peroxide in 50% silicone oil dispersion and is a cross-linking agent.

This mixture was first treated for 7 minutes at 130° C. in the mold and subsequently for 6 hours at 200° C. in the circulating air cabinet.

As flame retardant additive there was added to the mixture pyrogenic titanium dioxide, pure cerium dioxide, as well as the cerium containing silica of the invention according to Examples 1 and 2 in amounts of 3.5 parts per 100 parts of basic mixture The self-extinguishing properties were determined in accordance with the specification UL-94. For this purpose there were produced test strips of silicone rubber having the dimensions 130×13×2 mm. The strips were hung vertically and flamed for 15 seconds with a bunsen burner. The lower end of the test strip for this purpose is touched by the upper portion of the inner flame (inner flame (inner cone) height about 10 mm, outer flame (outer cone) height 40 mm). After removal of the flame the time until extinguishing of the burning of the silicone rubber sample was measured. After cooling, the sample was set fire to for the second time and again the time for extinguishment determined. The exact description of the process is set forth in German OS No. 2750706 (Toray Silicone Co.) on page 12, last paragraph.

The results are summarized in Table 2. The discussion of the test results with an addition of 0.14 part of hexachloroplatinic acid (Table 2) shows:

HTV silicone rubber without platinum catalyst burns completely.

An addition of hexachloroplatinic acid (0.14 part) already causes an extinguishment.

The addition of 3.5 parts of pyrogenic titanium dioxide reduces the duration of the burning.

Pure cerium dioxide in comparison to the platinum containing mixture is practically ineffective, the cerium containing precipitated silica corresponding to a $CeO_2$ content of 0.5 parts $CeO_2$ according to the invention already is effective. A good flame retarding effect is attained with a dosing of 10 parts of the silica of the invention corresponding to 1.5 parts of $CeO_2$.

No synergestic effects have been noted from mixtures of pure cerium dioxide of cerium containing precipitated silica according to Example 2 on the one hand and pyrogenic titanium dioxide on the other hand under the conditions chosen and in regard to the mechanical properties of the HTV silicone rubber vulcanizate, the product of the invention behaves the most favorably.

TABLE 1

Testing of Heat Stabilizers in Heat Hardening Silicone Rubber

Part A

Type and Composition of Heat Stabilizer

| Pretreatment of the Test Article at 300° C. | Without Addition | Cerium Dioxide (Pure) | | Cerium Dioxide Batch (50 wt %) | | |
|---|---|---|---|---|---|---|
| | | 1.5 wt % | 3.0 wt % | 1.0 wt % | 1.5 wt % | 3.0 wt % |
| Hardness | | | | | | |
| Without Aging | 52 | — | — | — | — | — |
| 6 h at 200° C. | 62 | 70 | 69 | — | 70 | 69 |
| 2 days at 300° C. | 91 | 94 | 69 | — | 91 | 69 |
| 4 days at 300° C. | * | * | 74 | | * | 72 |
| 8 days at 300° C. | | | 79 | | | 75 |
| 12 days at 300° C. | | | 95 | | | 80 |
| 16 days at 300° C. | | | — | | | — |
| 24 days at 300° C. | | | * | | | 86 |
| 36 days at 300° C. | | | | | | * |
| Elongation at break (%) | | | | | | |
| Without aging | 290 | — | — | — | — | — |
| 6 h at 200° C. | 240 | 200 | 210 | | 230 | 230 |
| 2 days at 300° C. | * | * | 220 | | 10 | 230 |
| 4 days at 300° C. | | | 150 | | * | 200 |
| 8 days at 300° C. | | | 75 | | | 100 |
| 12 days at 300° C. | | | — | | | — |
| 16 days at 300° C. | | | — | | | — |
| 24 days at 300° C. | | | — | | | — |
| Tensile strength ($Nmm^2$) | | | | | | |
| Without aging | 10.3 | — | — | — | — | — |
| 6 h at 200° C. | 9.7 | 8.8 | 8.4 | | 9.9 | 9.2 |
| 2 days at 300° C. | * | * | 4.9 | | 1.7 | 5.1 |
| 4 days at 300° C. | | | 5.2 | | * | 6.1 |
| 8 days at 300° C. | | | 4.4 | | | 4.8 |
| 12 days at 300° C. | | | — | | | — |
| 16 days at 300° C. | | | — | | | — |
| 24 days at 300° C. | | | — | | | — |
| Rebound Elasticity (%) | | | | | | |
| Without aging | — | — | — | — | — | — |
| 6 h at 200° C. | 55 | 53 | 54 | | 54 | 53 |
| 2 days at 300° C. | * | 58 | 47 | | 61 | 45 |
| 4 days at 300° C. | | * | 52 | | * | 49 |
| 8 days at 300° C. | | | 56 | | | 53 |
| 12 days at 300° C. | | | 63 | | | 57 |
| 16 days at 300° C. | | | * | | | — |
| 24 days at 300° C. | | | | | | 58 |

TABLE 1-continued

Testing of Heat Stabilizers in Heat Hardening Silicone Rubber 36 days at 300° C.                                                                                      *

Part B
Type and Composition of Heat Stabilizer

| Pretreatment of the Test Article at 300° C. | Pyrogenic TiO$_2$ | | Cerium Containing Silica According to Example 1 | | Cerium Containing Silica According to Example 2 | |
|---|---|---|---|---|---|---|
| | 0.5 wt % | 1.0 wt % | 1.0 wt % | 2.0 wt % | 1.5 wt % | 3.0 wt % |
| SHORE-A-Hardness | | | | | | |
| Without aging | 66 | 63 | 52 | 53 | — | — |
| 6 h at 200° C. | 72 | 70 | 62 | 62 | 70 | 70 |
| 2 days at 300° C. | 66 | 62 | 54 | 54 | 73 | 69 |
| 4 days at 300° C. | 68 | 65 | 59 | 59 | 76 | 72 |
| 8 days at 300° C. | 74 | 67 | 65 | 63 | 79 | 75 |
| 12 days at 300° C. | * | 72 | 70 | 67 | 82 | 79 |
| 16 days at 300° C. | 74 | 76 | 71 | — | — | |
| 24 days at 300° C. | — | 86 | 79 | 85 | 83 | |
| 36 days at 300° C. | — | 90 | 84 | 88 | 87 | |
| Elongation at break (%) | | | | | | |
| Without aging | 400 | 420 | 340 | 320 | — | — |
| 6 h at 200° C. 300 | 340 | 240 | 280 | 210 | 250 | |
| 2 days at 300° C. | 300 | 390 | 320 | 320 | 260 | 260 |
| 4 days at 300° C. | — | 480 | 280 | 270 | 220 | 200 |
| 8 days at 300° C. | — | — | 230 | 210 | 150 | 150 |
| 12 days at 300° C. | — | — | 160 | 200 | — | — |
| 16 days at 300° C. | — | — | 90 | 150 | — | — |
| 24 days at 300° C. | — | — | 70 | 100 | — | — |
| Tensile strength (Nmm$^2$) | | | | | | |
| Without aging | 9.1 | 9.4 | 8.3 | 8.5 | — | — |
| 6 h at 200° C. 9.1 | 9.6 | 6.8 | 9.2 | 10.0 | 10.1 | |
| 2 days at 300° C. | 4.6 | 5.5 | 5.0 | 5.5 | 6.5 | 6.5 |
| 4 days at 300° C. | — | — | 5.7 | 6.3 | 7.3 | 6.5 |
| 8 days at 300° C. | — | — | 5.9 | 6.2 | 5.4 | 6.0 |
| 12 days at 300° C. | — | — | 5.0 | 6.5 | — | — |
| 16 days at 300° C. | — | — | 4.9 | 5.8 | — | — |
| 24 days at 300° C. | — | — | 5.7 | 6.5 | — | — |
| Rebound elasticity (%) | | | | | | |
| Without aging | — | — | 41 | 42 | — | — |
| 6 h at 200° C. | — | — | 53 | 54 | 53 | 54 |
| 2 days at 300° C. | — | — | 32 | 32 | 50 | 46 |
| 8 days at 300° C. | — | — | 40 | 37 | 55 | 51 |
| 12 days at 300° C. | — | — | 45 | 41 | 56 | 53 |
| 16 days at 300° C. | — | — | 53 | 48 | 57 | 56 |
| 24 days at 300° C. | — | — | 60 | 52 | — | — |
| 36 days at 300° C. | — | — | — | — | 56 | 53 |

*embrittled

TABLE 2

Testing of Flame Retardant Additives in HTV Silicone Rubber

| Base mixture[1] | Parts | 100[2] | 100 | 100 | 100 | 100 | 100 | 100 | 100 |
|---|---|---|---|---|---|---|---|---|---|
| Pyrogenic Titanium Dioxide | " | — | — | 3.5 | — | — | — | 3.5 | 3.5 |
| Cerium dioxide (pure) | " | — | — | — | 3.5 | — | — | 3.5 | — |
| Silica according to Example 2 | " | — | — | — | — | 3.5[3] | 10[4] | — | 3.5[3] |

Self-Extinguishing Properties

| Duration of burning | | | | | | | | | |
|---|---|---|---|---|---|---|---|---|---|
| (1.burning) | seconds | burned | 90 | 27 | 100 | 60 | 30 | 27 | 35 |
| (2.burning) | " | | 1 | 12 | 17 | 8 | 0 | 6 | 3 |

Mechanical Properties

| Shore-A-Hardness | | 66 | 43 | 43 | 45 | 52 | 69 | 45 | 54 |
|---|---|---|---|---|---|---|---|---|---|
| Tensile Strength | N/mm$^2$ | 8.6 | 9.0 | 5.8 | 7.2 | 9.5 | 8.1 | 6.2 | 7.3 |
| Elongation at break | % | 210 | 260 | 240 | 250 | 230 | 150 | 240 | 200 |

TABLE 2-continued

Testing of Flame Retardant Additives
in HTV Silicone Rubber

| Effectiveness | N/mm$^2$ | 1.8 | 2.3 | 1.4 | 1.8 | 2.2 | 1.2 | 1.5 | 1.5 |
|---|---|---|---|---|---|---|---|---|---|

[1] Consisting of:
100 parts Silopren VS
40 parts Aerosil 200 V
1.4 parts Siloprenvernetzter Cl 50
0.14 parts Hexachloroplatinic acid (25% in water)
[2] Without hexachloroplatinic acid
[3] Corresponding to only about 0.5 parts cerium dioxide
[4] Corresponding to about 1.5 parts cerium dioxide The entire disclosure of German priority application P 3005137.7-41 is hereby incorporated by reference.

What is claimed is:

1. A cerium containing precipitated silica having the following physico-chemical properties:

| | | |
|---|---|---|
| BET-surface area according to DIN 66 131 | m$^2$/g | 140 ± 40 |
| Loss on drying according to DIN 55 921 | Wt.-% | 2.0–4.0 |
| Loss on ignition according to DIN 55 921 | Wt.-% | 2.5–12.5 |
| pH-according to DIN 53 200 | | 3.0–7.0 |
| Conductivity in 4% aqueous dispersion at 20° C. | μs | 500 |
| Packed density according to DIN 53 194 | g/l | 80 ± 40 |
| CeO$_2$-content, based on the material dried for 2 hours at 105° C. | Wt.-% | 0.3–50 |
| Sieve residue according to Mocker 45 μm (DIN 53 580) | Wt.-% | 0.2 |

2. A cerium containing precipitated silica according to claim 1 having the following physico-chemical properties:

| | | |
|---|---|---|
| BET-surface area according to DIN 66 131 | m$^2$/g | 140 ± 40 |
| Loss on drying according to DIN 55 921 | Wt.-% | 2.0–4.0 |
| Loss on ignition according to DIN 55 921 | Wt.-% | 4.0–7.0 |
| pH-according to DIN 53 200 | | 3.5–7.0 |
| Conductivity in 4% aqueous dispersion at 20° C. | μS | 500 |
| Packed density according to DIN 53 194 | g/l | 75 ± 25 |
| CeO$_2$-content based on the material dried for 2 hours at 105° C. | Wt.-% | 10–20 |
| Sieve residue according to Mocker 45 μm (DIN 53 580) | Wt.-% | 0.2 |

3. A process for producing the cerium containing precipitated silica of claim 1 comprising simultaneously adding a water glass solution and acid to water having a pH-value of 7 to 9 in a container at a temperature above 50° C. and up to the boiling point of the reaction mixture while employing shearing forces and holding the pH-value constant at 7 to 9 during a time span of 80 to 120 minutes, whereby after the termination of the precipitation there is present a pH-value of 7 to 9 in the reaction mixture, adding to the thus obtained precipitated silica original suspension and aqueous cerium (IV) salt solution adjusting the now acid reaction mixture to a pH-value of 6 to 8, washing the thus obtained cerium containing precipitated silica with water, drying and grinding.

4. A process according to claim 3 wherein the pH-value of the water originally present in the container is adjusted to the pH-value of 7 to 9 with a water glass solution having a mole ratio of SiO$_2$:Na$_2$O=1:3.46 and a content of 26.8 weight % SiO$_2$ and 8.0 weight % of Na$_2$O.

5. A process according to claim 4 wherein the acid employed in sulfuric acid having a concentration of 50 to 96 weight %.

6. A process according to claim 5 wherein the aqueous cerium (IV) salt solution is a Ce(SO$_4$)$_2$ solution.

7. A process according to claim 6 wherein the cerium salt solution is a solution of cerium (IV) sulfate.4H$_2$O saturated at 20° C.

8. A process according to claim 3 wherein the acid employed is sulfuric acid having a concentration of 50 to 96 weight %.

9. A process according to claim 3 wherein the acid is sulfuric acid, nitric acid, phosphoric acid, carbonic acid, formic acid or acetic acid.

10. A process according to claim 3 comprising fluidizing the cerium containing precipitated silica filter cake using shearing forces and then spray drying and grinding.

11. A process according to claim 10 wherein the cerium salt solution is a solution of cerium (IV) sulfate.4H$_2$O saturated at 20° C.

12. A process according to claim 3 wherein the cerium salt solution is a solution of cerium (IV) sulfate.4-H$_2$O saturated at 20° C.

* * * * *